W. B. OLD.
AUTOMOBILE HEADLIGHT.
APPLICATION FILED JAN. 26, 1914.

1,171,135.

Patented Feb. 8, 1916.

Witnesses:
John a Bergstrom

Inventor
William B. Old
By Attorney W.H.C. Clarke.

THE COLUMBIA PLANOGRAPH CO., WASHINGTON, D. C.

UNITED STATES PATENT OFFICE.

WILLIAM B. OLD, OF DENISON, TEXAS.

AUTOMOBILE-HEADLIGHT.

1,171,135.  Specification of Letters Patent.  Patented Feb. 8, 1916.

Application filed January 26, 1914. Serial No. 814,547.

*To all whom it may concern:*

Be it known that I, WILLIAM B. OLD, a citizen of the United States, residing at Denison, in the county of Grayson and State of Texas, have invented a new and useful Improvement in Automobile-Headlights, of which the following is a specification.

I have invented an improved headlight for automobiles and the like, and my object is to provide a headlight which will automatically turn to one side, when the vehicle is rounding a curve, in order to light the pathway directly ahead and thus enable the vehicle to proceed with greater safety whenever its course is to be changed. I also aim to locate and operate my invention at the front of the vehicle, and to produce a comparatively simple device that can be manufactured at a relatively low cost.

The above and other objects and advantages of my invention will appear from the following description, taken in connection with the accompanying drawings and be particularly pointed out in the appended claims. But I wish to have it understood that this disclosure is illustrative only and that changes may be made in my construction within the limits of the meanings of the terms in which the claims are expressed.

Figure 1:
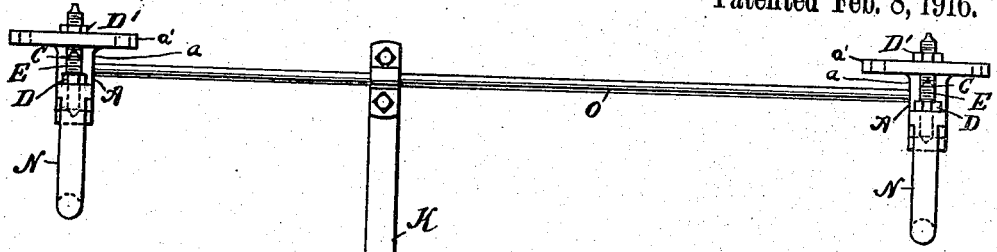
Figure 2:
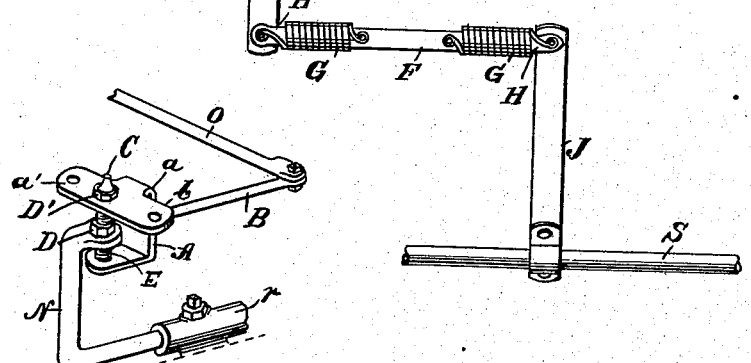
Figure 3:
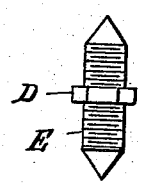
Figure 4:
Figure 5:
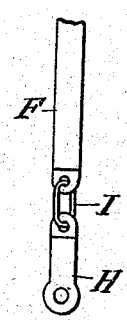

On said drawings Figure 1 is a front elevation of my invention in position for use; Fig. 2 is a perspective view showing how the support for each headlight is mounted to give the desired result; Figs. 3 and 4 are views of certain details; and Fig. 5 is a view showing a part of the operating connections for my invention.

The same reference characters are employed to indicate the same parts throughout.

In the practice of my invention I employ a bearing r, affixed to any convenient point on the framework of an automobile at the front thereof, and this bearing receives the stem or shank of a bracket N, which is fastened therein by a suitable screw. The bracket is preferably L-shaped, and there will be two such bearings and brackets, one for each headlight as will be understood. On each bracket is pivotally mounted an element carrying a headlight and these elements are connected so as to be simultaneously operated from the steering gear; whereby when the car is made to turn, the headlights will swing in the same direction and thus continue to illuminate the roadway immediately in front of the vehicle and enable the chauffeur to see clearly what lies ahead of him.

The bracket N has its outer end perforated and threaded to receive a double pointed pivot screw E, which is adjustably held in place by a lock nut D. The elements for carrying the lamps or headlights, which are not shown, are indicated by the letter A, and each element A comprises a substantially U-shaped portion a, one end of which has a cross bar a', with perforations in its extremities to receive legs or standards which bear the casings of the lamps. The cross-bar a' is perpendicular to the general plane of the element A, and is perforated and threaded in the middle to receive the socket member C, having a lock nut D' to hold the same in place. At its lower end the member C is shaped to fit the upper end of the screw E, and the lower end of the screw E is received in a recess in the end of the portion a opposite the middle of the bar a'. In this way the element A is pivotally mounted on the bracket N, and each element has an extension B to operate it. The part a and extension B really make each element A yoke-shaped with the cross bar a' normal to the plane of the yoke.

The two extensions are pinned to the ends of a connecting rod O, actuated from the steering rod S. This rod is adapted to control the front wheels of the vehicle, which are not illustrated, and is operated from the steering post. To the rod O is secured a rigid arm K, and to the rod S a similar rigid arm J. The arms J and K extend toward each other but are not in the same vertical plane, as seen in Fig. 1. Their outer ends are preferably on the same horizontal level, and are flexibly united, to allow for the movement of the body of the car on its springs toward and from the plane of the wheel centers and otherwise. Hence I utilize a rod F, and at each end of this rod are link members comprising a ring I and stud H, pivotally joined to the rod and the outer end of the adjacent arm. Fastened to the rod and the arms J and K are also the spiral springs G, which encircle the link members, and maintain them in distended relation. These springs keep the rod F and the link members in alinement when the arm J pushes the arm K, and the rod and the link members of course keep themselves in alinement when the arm J pulls the arm K. At the same time the springs insure sufficient flexibility to enable the rod and link members to adjust themselves to all relative positions of the rods O and S and the arms J and K, owing to the motion of the car body on its springs, and efficiently operate the lights to turn them as desired whenever necessary.

It will now be seen that my invention is simple in construction, and easy to operate in practice, and capable of affording certain results under all conditions. It can also be readily and cheaply produced, and can very conveniently be mounted on any vehicle, now in use.

Having described my invention what I believe to be new and desire to secure and protect by Letters Patent of the United States is:—

1. An improved support for a headlight comprising an element in the form of a yoke, means for engaging the ends of the arms of said yoke to enable said element to be pivotally mounted, a cross-bar carried at the end of one of said arms for mounting the headlight thereon, and means for operating the shank of the yoke to turn the headlight.

2. An improved support for a headlight comprising a bracket adapted to be mounted upon a vehicle, said bracket carrying a double-pointed screw extending through its outer end, and an element adapted to bear the headlight pivotally engaging the said screw, said element having a socket member adjustably secured thereto, whereby both ends of said screw and said element can be retained in operative relation.

3. An improved operating device for a headlight comprising a rod, an arm, a plurality of link members for securing an end of the rod to an end of the arm, and a spiral spring fastened to said rod and said arm and encircling said members.

4. Improvements in headlights comprising a pair of pivoted supports, an operating rod connecting the same, a rigid arm carried by the rod, a steering rod, a rigid arm on the steering rod, a third rod, a plurality of link members uniting the ends of the third rod to the outer ends of said arms, and spiral springs encircling the link members and secured to said third rod and said arms.

5. An improved support for a headlight comprising a bearing, a bracket mounted therein, said bracket carrying a double-pointed screw extending through its outer end, a yoke having a socket member mounted on one arm thereof, said screw engaging the socket member and the other arm of said yoke, whereby the yoke is pivoted on said bracket, a cross bar at the end of the first-named arm for carrying the headlight, and means for operating the shank of the yoke to turn the headlight.

6. An improved support for a headlight comprising an element having a substantially U-shaped part with a cross bar at one end, for carrying the headlight, an extension for actuating said element to turn the headlight, and means for pivotally mounting said element.

7. An improved support for a headlight comprising a bearing, a bracket mounted therein, an element having a substantially U-shaped portion with a cross bar at one end for carrying the headlight, means engaging the middle of said bar and a point opposite the same on said portion for pivotally mounting said element on the bracket, and an extension on said element for operating the same to turn said headlight.

WM. B. OLD.

Witnesses:
H. M. WISDOM,
IRA M. OLD.

Copies of this patent may be obtained for five cents each, by addressing the "Commissioner of Patents, Washington, D. C."